(12) United States Patent
Buckwalter et al.

(10) Patent No.: US 12,267,094 B2
(45) Date of Patent: Apr. 1, 2025

(54) SPECTRUM-COMPRESSING RECEIVER AND RECEPTION METHOD FOR NON-CONTIGUOUS CARRIER AGGREGATION

(71) Applicant: The Regents of the University of California, Oakland, CA (US)

(72) Inventors: James F. Buckwalter, Santa Barbara, CA (US); Hussam Alshammary, Goleta, CA (US)

(73) Assignee: The Regents of the University of California, Oakland, CA (US)

( * ) Notice: Subject to any disclaimer, the term of this patent is extended or adjusted under 35 U.S.C. 154(b) by 378 days.

(21) Appl. No.: 17/640,691

(22) PCT Filed: Sep. 3, 2020

(86) PCT No.: PCT/US2020/049118
§ 371 (c)(1),
(2) Date: Mar. 4, 2022

(87) PCT Pub. No.: WO2021/050345
PCT Pub. Date: Mar. 18, 2021

(65) Prior Publication Data
US 2022/0345165 A1 Oct. 27, 2022

Related U.S. Application Data

(60) Provisional application No. 62/899,926, filed on Sep. 13, 2019.

(51) Int. Cl.
*H04B 1/10* (2006.01)
*H04L 5/00* (2006.01)
*H04L 27/00* (2006.01)

(52) U.S. Cl.
CPC .............. *H04B 1/10* (2013.01); *H04L 5/001* (2013.01); *H04L 5/0041* (2013.01); *H04L 27/0014* (2013.01)

(58) Field of Classification Search
CPC ......... H04B 1/10; H04L 5/001; H04L 5/0041; H04L 27/0014
See application file for complete search history.

(56) References Cited

U.S. PATENT DOCUMENTS 6,937,175 B1 * 8/2005 Cruz-Albrecht ...... H03F 1/3247
341/145
8,085,068 B1 12/2011 Subramanian
(Continued)

FOREIGN PATENT DOCUMENTS

WO 2018182573 A1 10/2018

OTHER PUBLICATIONS

International Search Report and Written Opinion from the corresponding International Patent Application No. PCT/US2020/049118, dated Nov. 9, 2020.
(Continued)

*Primary Examiner* — Michael A Keller
*Assistant Examiner* — Thao D Duong
(74) *Attorney, Agent, or Firm* — Greer, Burns & Crain, Ltd.; Steven P. Fallon (57) ABSTRACT

A method for carrier aggregation receives a signal with multiple non-contiguous carrier bands. Frequency converting of the signal to a compressed single intermediate frequency band with a pseudonoise code applied to a local oscillation of each of the multiple non-contiguous carrier bands while maintaining separation of the multiple non-contiguous carrier bands permits reduced complexity digital signal processing to detect spectral power density and demodulate waveforms across multiple channels. A receiver (Continued)

includes a pseudorandom noise generator applying a pseudo noise code to the local oscillator generator to produce a unique set of spectral tones in the output signal that sample-specific channels over the multiple non-contiguous carrier bands.

18 Claims, 9 Drawing Sheets

(56) References Cited

U.S. PATENT DOCUMENTS

| | | | |
|---|---|---|---|
| 2002/0121923 A1* | 9/2002 | Drost | H03K 5/13 327/298 |
| 2005/0017800 A1* | 1/2005 | Robinson | H03F 1/3223 330/149 |
| 2005/0092943 A1* | 5/2005 | Nitsche | G01T 1/2014 250/458.1 |
| 2006/0039447 A1* | 2/2006 | Sahinoglu | H04B 1/71635 375/130 |
| 2008/0192876 A1* | 8/2008 | Dulger | H03L 7/1806 375/376 |
| 2010/0167684 A1 | 7/2010 | Kerth | |
| 2011/0200161 A1* | 8/2011 | Tasic | H03L 7/1976 377/48 |
| 2014/0293818 A1* | 10/2014 | Sesia | H04L 1/0026 370/252 |
| 2017/0250716 A1* | 8/2017 | Kinget | H04B 1/0017 |
| 2018/0323813 A1* | 11/2018 | Kim | H03F 3/68 |
| 2021/0409173 A1* | 12/2021 | Chatterjee | H04L 5/0053 |

OTHER PUBLICATIONS

Sadjina et al., "A Mixed-Signal Circuit Technique for Cancellation of Multiple Modulated Spurs in 4G/5G Carrier-Aggregation Transceivers", 2019 IEEE International Solid-State Circuits Conference, 2019, pp. 356-358, IEEE.

Hwu et al., "An RF Receiver for Intra-Band Carrier Aggregation", IEEE Journal of Solid-State Circuits, 2015, pp. 946-961, vol. 50, No. 4, IEEE.

Haque et al., "A Reconfigurable Architecture Using a Flexible LO Modulator to Unify High-Sensitivity Signal Reception and Compressed-Sampling Wideband Signal Detection", IEEE Journal of Solid-State Circuits, 2018, pp. 1577-1591, vol. 53, No. 6, IEEE.

Liu et al., "A Sub-mW Fractional-N ADPLL With FOM of -246 dB for IoT Applications", IEEE Journal of Solid-State Circuits, 2018, pp. 3540-3552, vol. 53, No. 12, IEEE.

* cited by examiner

SPECTRUM-COMPRESSING RECEIVER AND RECEPTION METHOD FOR NON-CONTIGUOUS CARRIER AGGREGATION

PRIORITY CLAIM AND REFERENCE TO RELATED APPLICATION

The application claims priority under 35 U.S.C. § 119 and all applicable statutes and treaties from prior U.S. provisional application Ser. No. 62/899,926, which was filed Sep. 13, 2019.

STATEMENT OF GOVERNMENT INTEREST

This invention was made with government support under grant no. HR0011-17-2-0001 awarded by the Defense Advanced Research Projects Agency. The government has certain rights in the invention.

FIELD

Fields of the invention include signal reception and receivers. The invention concerns a receiver that can compress a spectrum to aggregate non-contiguous bands while maintaining band separation for digitization and decoding.

BACKGROUND

Future wireless systems are expected to make use of available RF channels over several bands to provide diversity. Current 3GPP standards, which cover all GSM, W-CDMA, LTE, and 5G specifications already support carrier aggregation (CA) to leverage unused RF bands and improve capacity and reliability. Carrier aggregation typically requires a dedicated receive channel with separate ADC (analog to digital converter) for each channel that is received. This results in a linear scaling of power consumption and therefore a constant increased energy requirement to improve the data throughput on a wireless network.

Spectrum compression has been used in ad hoc tuning to find an available frequency band for communications. Spectrum compression has also been used for detecting channel interference. Kinget et al., US Published Application No. 2017/0250716, discloses methods and circuits for detecting interference that compress a spectrum to identify interferers, so that identified interferers can be filtered to obtain the desired signal. The methods use a "rapid interferer detection" that downconverts an input signal. Multiple branch signals are produced, multiplied by pseudorandom noise, low pass filtered and converted by separate ADC converters to digital, combined, and then interferers are determined from the combined digital signal. This technique does not use downconversion to recover carriers and requires multiple ADCs to identify interferers.

Figure 1A:
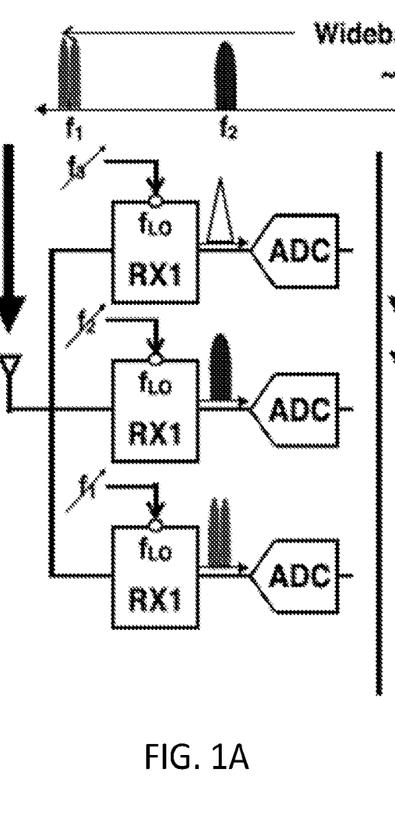
FIG. 1A (prior art) is a schematic diagram of a conventional current carrier aggregation receiver.

FIG. 1A shows a conventional approach to receiving multiple RF channels concurrently. Each channel is assigned to an independent receiver (RX) with a separate phase-locked loop (PLL) and analog-to-digital converter (ADC). The RX chains are tuned with the PLL to the desired RF channel, $f_1$, $f_2$, and $f_3$. This conventional scheme has several undesirable features. First, the RX chain offers no rejection to out-of-band (OOB) blockers. Second, the power consumption and chip area scale with the number of received channels. Third, the independent tuning of multiple local oscillators (LOs) requires long locking times for the PLL.

Recent work on carrier aggregation receivers is based on tuning a single PLL [S. Sadjina, R. S. Kanumalli, K. Dufrêne, M. Huemer, and H. Pretl, "21.7 a mixed-signal circuit technique for cancellation of multiple modulated spurs in 4G/5G carrier-aggregation transceivers," in IEEE Int. Solid-State Circuits Conf. (ISSCC) Dig. Tech. Papers, February 2019, pp. 170-172], [S. C. Hwu and B. Razavi, "An RF receiver for intra-band carrier aggregation," IEEE J. Solid-State Circuits, vol. 50, no. 4, pp. 946-961, April 2015] and multiple PLLs. Since the coherence time ($T_{coh}$) of a wireless channel, defined as the time over which the channel spectrum power remains constant, has been characterized in prior work as on the order of a few 1 ms for a 1-GHz channel with 100-Hz Doppler spread [D. Tse and P. Viswanath, Fundamentals of Wireless Communication. Cambridge, U.K.: Cambridge Univ. Press, 2013], dynamically switching bands based on spectrum sensing (SS) requires detecting the available spectrum within 10 μs and transmitting the data over a roughly 100-μs period.

Recent work describes SS algorithms that can be implemented in CMOS RF front ends. [See, e.g., T. Haque et al., "A reconfigurable architecture using a flexible LO modulator to unify high-sensitivity signal reception and compressed-sampling wideband signal detection," IEEE J. Solid-State Circuits, vol. 53, no. 6, pp. 1577-1591 June 2018]. These and other similar algorithms detect the blockers passively without any blocker rejection, complicating the SS probability of detection in an environment with multiple strong blockers. Other recent work describes sweeping the LO and scanning the down-converted baseband (BB) signal. Typically, a state-of-the-art PLL will not settle faster than 5 μs [H. Liu, D. Tang, Z. Sun, W. Deng, H. C. Ngo, and K. Okada, "A sub-mW fractional-N ADPLL with FOM of −246 dB for IoT applications," IEEE J. Solid-State Circuits, vol. 53, no. 12, pp. 170-172, December 2018], making detection over a wide frequency band (i.e., more than a few channels) extremely slow. In a dynamic spectrum or blocker environment, a swept PLL may be inadequate to detect the occupied spectrum with high reliability.

SUMMARY OF THE INVENTION

A preferred embodiment provides a method for carrier aggregation. A signal with multiple non-contiguous carrier bands is received. The signal is frequency converted to a compressed single intermediate frequency band with a pseudonoise code applied to a local oscillation of each of the multiple non-contiguous carrier bands while maintaining separation of the multiple non-contiguous carrier bands. The compressed intermediate frequency band is converted to a combined digital signal. Digital signal processing of the combined digital signal is conducted to detect spectral power density and waveform characteristics across multiple channels over non-contiguous carrier bands and/or obtain data from each of the multiple non-contiguous carrier bands from the combined digital signal.

A spectrum compressing receiver for carrier aggregation of multiple non-contiguous carrier bands includes a local oscillator generator that receives a carrier aggregation signal and a fixed local oscillator signal and provides a modulated output signal. A pseudorandom noise generator applies a pseudo noise code to the local oscillator generator to produce a unique set of spectral tones in the output signal that sample-specific channels over the multiple non-contiguous carrier bands. An N-Path Filter down converts output of the output signal to an aggregated intermediate frequency output signal with sufficient bandwidth for the carrier aggregation channels. An analog to digital converter converts the aggregated intermediate frequency output signal to a digitized signal. A digital signal processor recovers each of the multiple non-contiguous carrier bands from the digitized signal.

BRIEF DESCRIPTION OF THE DRAWINGS

The invention will be explained in greater detail hereinafter on the basis of exemplary embodiments illustrated in the drawings, in which.

DETAILED DESCRIPTION OF THE PREFERRED EMBODIMENTS

The present inventors have determined that a carrier aggregation (CA) receiver should also support spectrum sensing (SS) over a wide bandwidth (BW) with low sensing latency. In addition, the receiver should tolerate strong blockers within the RF band during the SS or CA operation.

Preferred embodiment receivers and reception methods provides a receiver that has a single receiver chain and single ADC to capture multiple non-contiguous bands simultaneously. The preferred embodiment provides a sub-linear increase in the power consumption of the receiver and realizes improved energy for carrier aggregation. Digital processing applied on the RF side before ADC conversion compresses the spectrum while maintaining sufficient separation between non-contiguous bands such that signals from each of the non-contiguous bands can be recovered after conversion of the compressed spectrum to digital.

A preferred embodiment receiver mixes several channels across a wide range of RF frequency bands to adjacent channels at an intermediate frequency (IF) (IF>BW*N where N is number of signals to simultaneously capture) chosen to receive the total signal bandwidth (BW). The compression in the bandwidth results in a reduction in the processing bandwidth of the ADC. Furthermore, the channel selection does not require phase locked loop (PLL) tuning and an example receiver according to the invention has achieved channel switching times of 25 ns. The prototype receiver chip tunes over a bandwidth of 100 MHz to 1.4 GHz and demonstrates out-of-band (OOB) rejection of 49 dB and measured sensitivity of receiver is −86 dBm, which is the lowest measured for N-path-based receivers. The chip performance has been verified with over-the air (OTA) measurement of two transmitted signals 80 MHz apart that are received simultaneously with a 10 MHz ADC with error-vector magnitude (EVM) around −20 dB. The measured dynamic range for EVM<−20 dB is better than 86 dB for a QPSK constellation. The example chip was fabricated in a Global Foundries 45 nm RF SOI process and occupies an active area of 0.55 mm-sq while the power consumption is 23.1 mW when operating at 1 GHz.

Preferred embodiments of the invention will now be discussed with respect to the drawings. The drawings may include schematic representations, which will be understood by artisans in view of the general knowledge in the art and the description that follows. Features may be exaggerated in the drawings for emphasis, and features may not be to scale.

Figure 1B:
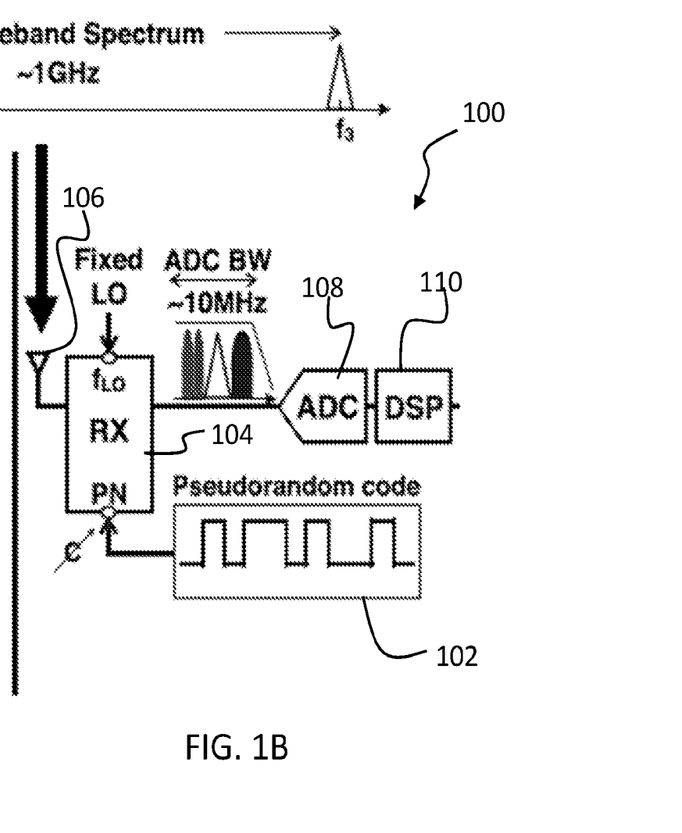
FIG. 1B is a schematic diagram of a preferred embodiment spectrum sensing carrier aggregation receiver.

FIG. 1B shows a preferred embodiment spectrum-compressing receiver architecture 100. A pseudonoise (PN) (also known as pseudorandom) code generator 102 provides a PN code that modulates a single local oscillator 104 to produce a unique set of spectral tones that sample-specific channels over a wide RF band received via an antenna 106. The individual channels are down-converted via the PN-modulated local oscillator (LO) 104 to an aggregated intermediate frequency with sufficient bandwidth for the carrier aggregation channels where each channel is separated by a desired channel spacing and digitized with a single analog-to-digital (ADC) 108 operating at a sample rate high enough to process all three signals corresponding to three separate bands. Generally, the minimal spacing is determined by the bandwidth of the signals and the PN spectral components that are related to the chip rate. The selection of the chip rate determines the IF separation. A digital signal processor (DSP) 110 filters and demodulates the carrier aggregation signals or detects spectral power density over multiple channels through spectrum sensing algorithms in DSP 110. Once the observation is complete, the DSP 110 can change the modulated code to sample other channels without any change in the LO frequency for rapid reconfiguration. In other words, the DSP can first detect occupied signal bands, and then simultaneously demodulate a plurality of bands. The PN generator modulates the LO with a PN sequence and does not require re-tuning the PLL or re-calibration at each frequency channel, thereby significantly reducing the scan time.

Regarding the PN code, a random code C(t) of length M can be decomposed into Fourier coefficients based on the sequence values, $$C(t) = \sum_{m=-\infty}^{\infty} \sum_{k=1}^{M} a[k](-j)^{\frac{4m(k-1)}{M}} a_m e^{jm\frac{\omega c}{M}t} \text{ where} \quad (1)$$

$$a_m = \frac{\sin m\frac{\pi}{M}}{m\pi} e^{\frac{-j\pi m}{M}}.$$

Here, $\omega_c=2\pi f_c$, where $f_c$ is the chip rate of the sequence. The Fourier domain representation of the periodic code gives insight into the ability to tailor the LO spectrum with weights at the different frequency taps. To simplify (1), we consider only the spectral components up to the chip rate:

$$C(t) \approx \sum_{m=-M/2}^{+M/2} a_m e^{j\frac{m\omega_c}{M}t} \sum_{k=1}^{M} a[k](-j)^{\frac{4m(k-1)}{M}}. \quad (2)$$

In other words, each M-length code has up to M frequency components spaced by $f_c/M$ as well as a component at dc. The amplitude at each frequency component is:

$$c_m = a_m \sum_{k=1}^{M} a[k](-j)^{\frac{4m(k-1)}{M}}. \quad (3)$$

Therefore, the Fourier series is $$C(t) \approx \sum_{m=-2}^{+M/2} c_m e^{j(\frac{m\omega_c}{M})t}.$$

For example, a Walsh code of length 8 has eight potential codes. The second Walsh code ($W_2$) has a sequence of a[k]=[1 0 1 0 1 0 1 0]. After applying (2) to $W_2$, each frequency is $$c_m = \left[\frac{1}{\pi} 000\langle 0\rangle 000\frac{1}{\pi}\right]$$

at frequency components $$\left[-f_c \ -\frac{3f_c}{4} \ \ldots \ +\frac{3f_c}{4} \ +f_c\right].$$

When the code is multiplied by an LO frequency $f_{LO}$, the spectral components of the code are modulated around he LO, for example $$\left[f_{LO}-f_c \ f_{LO}-\frac{3f_c}{4} \ \ldots \ f_{LO}+\frac{3f_c}{4} \ f_{LO}+f_c\right].$$

Therefore, the modulated LO has two components with 5 dB of loss relative to the local oscillator, which potentially degrades the sensitivity. Since the dc component of a Walsh codes is always 0, e.g., cm=0, the RX can select different frequency components for carrier aggregation without interference from the blockers near the local oscillator frequency.

To aggregate two carriers at $f_1$ and $f_2$ without interference to an IF location, $f_{LO}$ and $f_c$ need to be tuned. The two RF carriers are down converted to IF frequencies $IF_1$ and $IF_2$ $$f_{LO} = \frac{f_1 + f_2 + IF_2 + IF_1}{2} \quad (4)$$

$$f_c = f_2 - f_1 + IF_2 + IF_1. \quad (5)$$

To determine minimum spacing, assuming that the two desired carriers have a bandwidth BW, the receiver should allow that $IF_2=IF_1+BW$. Therefore, $$f_{LO} = \frac{f_1 + f_2 + BW}{2} \quad (6)$$

$$f_c = f_2 - f_1 + 2IF_1 + BW. \quad (7)$$

To capture example existing bands of 2100 and 3500 MHZ, a Walsh code with a respective local oscillator frequency and chip rate of 2801 and 1406 MHz can be used.

If more than two carriers are aggregated, a different Walsh code can be selected. For Walsh 6 ($W_6$), [1 0 1 0 0 1 0 1] and the Fourier coefficients are [0 0.256 0 0.132 (0) 0 0.132 0 0.256 0] allowing the aggregation at four RF channels.

Figure 2:
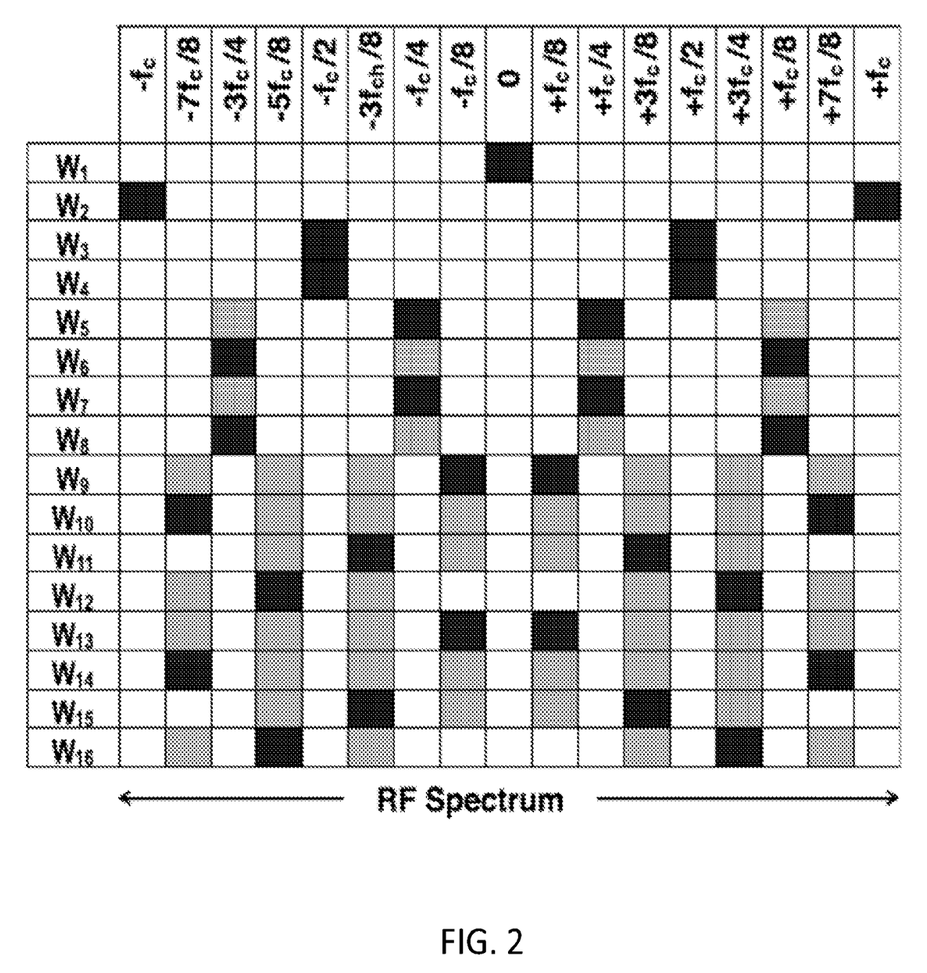
FIG. 2 shows the approximated frequency components of Walsh family of length 16.

A comprehensive list of the frequency components and relative power levels of Walsh codes of length 16 are shown in FIG. 2. The relative amplitudes of the Fourier coefficients are indicated with darker contrast. The first Walsh code ($W_1$) is a sequence of ones, so it only has a dc component and can select only one channel. The $W_2$, $W_3$, and $W_4$ codes select two channels simultaneously. Note that $W_3$ and $W_4$ are degenerate. The $W_5$-$W_8$ codes select four channels simultaneously. The $W_9$-$W_{16}$ codes aggregate up to six channels. Given a fixed local oscillator, changing the Walsh code can select any channel across the band in FIG. 2.

Figure 3:
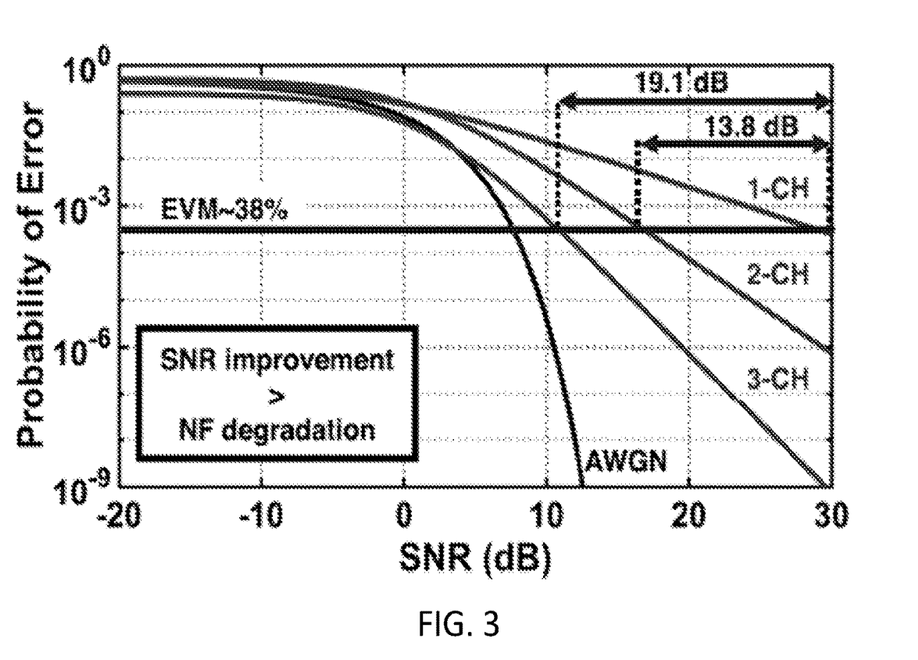
FIG. 3 plots the probability of error (Pe) as a function of signal-to-noise ratio (SNR) for an additive white Gaussian noise (AWGN) channel and a fading wireless channel.

FIG. 2 suggests that reduced local oscillator amplitude at each spectral component leads to higher spot noise figure (NF) due to the reduced conversion gain. Nonetheless, the higher NF is offset by a significant advantage from the NC-CA diversity technique. FIG. 3 plots the probability of error (Pe) as a function of signal-to-noise ratio (SNR) for an additive white Gaussian noise (AWGN) channel and a fading wireless channel [D. Tse and P. Viswanath, Fundamentals of Wireless Communication. Cambridge, U.K.: Cambridge Univ. Press, 2013.]. In the AWGN channel, Pe improves exponentially with SNR, suggesting that higher NF is undesirable.

However, the multi-path fading channel does not provide a significant benefit due to the SNR. Even when the RX SNR is large, the multiple paths can destructively interfere and degrade Pe inversely proportional to SNR. The NC-CA diversity improves the Pe of the wireless channel by adding an independent degree of freedom [D. Tse and P. Viswanath, Fundamentals of Wireless Communication. Cambridge, U.K.: Cambridge Univ. Press, 2013]. To achieve a Pe of $10^{-3}$ with a fading channel, the SNR needs to exceed 30 dB in the absence of diversity. With the diversity-2 channel, Pe of $10^{-3}$ is achieved with the SNR of 13 dB. Considering an SNR degradation of 3 dB with the diversity channel, Pe of $10^{-7}$ is reached for 30 dB. In other words, CA targets increased the capacity of the wireless channel for high SNR where NF is not usually the limitation. In commercial products, the low noise amplifier (LNA) gain is reduced or the LNA might be bypassed in the carrier aggregation mode to improve the linearity of the receiver to realize the diversity. See, D. Whitefield and S. Shah, "Integrated LAA/Wi-Fi RF front-end solutions meet new requirements in 5G smartphones," in Proc. Skyworks Tech. Article, 2018. [Online]. Available: http://www.skyworksinc.com/downloads/press_room/published_articles/MWJ_%5G_WiFi_RF_FEM_201902.pdf.

Figure 4A:
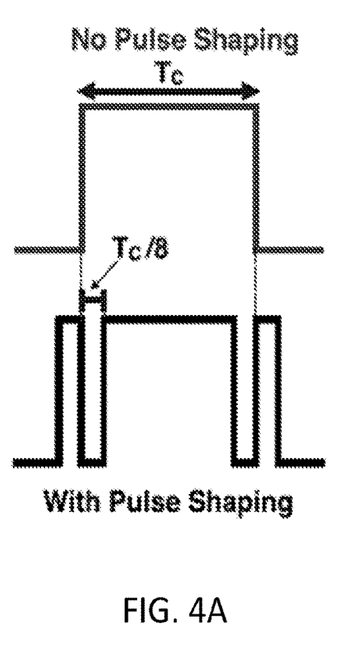
FIG. 4A illustrates a preferred pulse shaping technique.
Figure 4B:
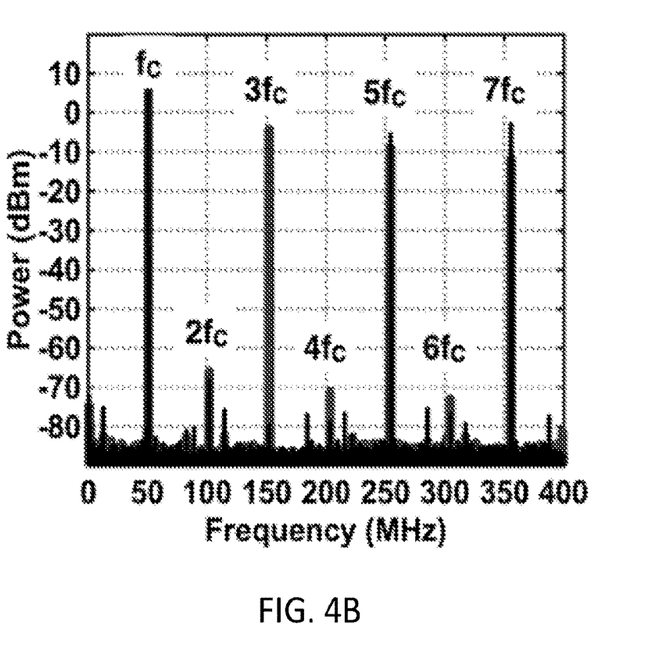
FIG. 4B shows the measured spectrum of generated waveform with pulse shaping.

To eliminate aggregation from the out-of-band harmonics, a pulse shaping technique can be added to FIG. 4A. A suitable pulse shaping technique is disclosed in Hill et. al, "Watt-Level, Direct RF Modulation in CMOS SOI With Pulse-Encoded Transitions for Adjacent Channel Leakage Reduction," IEEE Transactions on Microwave Theory and Techniques Volume: 67, Issue: 12 (2019). Pulsewidth modulation at the edges mimics a raised cosine filter and chosen to suppress the third-order harmonic. This comes at the cost of reducing the power of fundamental and increasing the power of higher order harmonics while increasing the chip rate by a factor of 8. The measured spectrum of generated waveform is shown in FIG. 4B.

Figure 5:
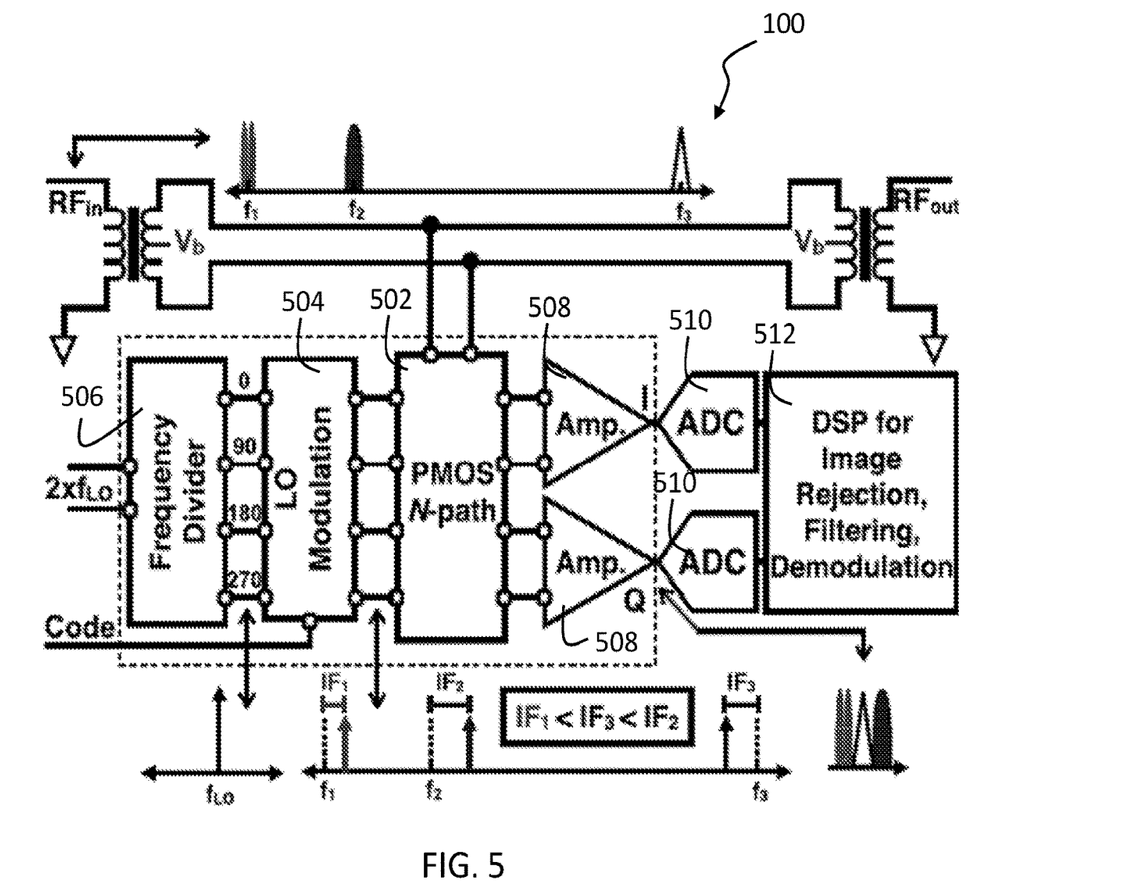
FIG. 5 is a block diagram of the preferred embodiment spectrum sensing carrier aggregation receiver.

FIG. 5 is a block diagram of the preferred embodiment spectrum sensing carrier aggregation receiver 100. With the receiver 100, an RF signal is balanced into a differential signal and a PMOS N-path filter 502 down-converts the signals to sample onto baseband amplifiers 508. The spectrum sensing carrier aggregation receiver 100 can be tapped from a primary RX that might have higher NF allowing for usage of the spectrum sensing carrier aggregation receiver 100 as a diversity path. The 75% duty-cycle local oscillators are generated and modulated on chip in a preferred implementation.

The N-Path Filter 502 is preferably implemented in PMOS, while NMOS switches can also be used. N=4 is the simplest N path filter. N is a general number of paths that are consecutively sampled. N is typically 4 or 8. A local modulator 504 receive the PN code that is configured to produce a unique set of spectral tones that sample-specific channels over the multiple non-contiguous carrier bands. In the preferred embodiment, a frequency divider 506 first separates the received band into four components, namely 0-89°, 90-179°, 180-269°, and 270-359° to process in-phase and quadrature components separately (I+, Q+, I− and Q−). With the four separate components of the band, the modulator 504 applies the PN code to each of the in-phase and quadrature components I+, Q+, I− and Q−. The N-Path Filter 502 then outputs a compress intermediate frequency in differential form to in-phase and quadrature baseband amplifiers 508. ADCs 510 convert the in-phase and quadrature signals to digital, which are then processed by a digital signal processor 512. While two ADCs 510 are shown, they could be replaced with single ADC to sample both I and Q channels. The pair of ADCs 510 are used to sample I and Q channels separately. The DSP 512 conducts standard signal processing, including determining which channel is optimal from the standpoint of signal-to-noise ratio, demodulating and sampling the data stream, and performing error correction of data. The DSP 512 can conduct reduced complexity digital signal processing, compared to prior techniques, to detect spectral power density and demodulate waveforms across multiple channels as a result of the frequency converting the signal to a compressed single intermediate frequency band with a pseudonoise code applied to a local oscillation of each of the multiple non-contiguous carrier bands conducted by the frequency divider 506, LO modulation 504 and N-path filed 502.

Figure 6:
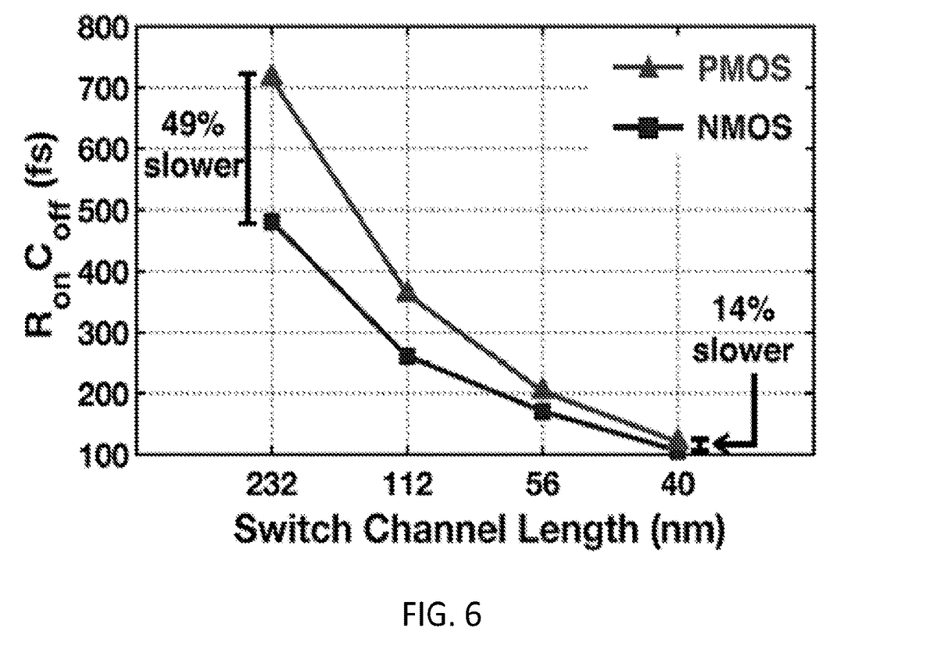
FIG. 6 shows a comparison between NMOS and PMOS $R_{on}C_{off}$ product (simulation)

FIG. 6 shows a comparison between NMOS and PMOS $R_{on}C_{off}$ product (simulation) for different devices in a 45-nm RF SOI process. At the shortest channel length, the PMOS switches are only 14% slower than NMOS switches. The PMOS devices potentially offer higher breakdown and improved linearity and are preferred for those benefits.

Figure 7A:
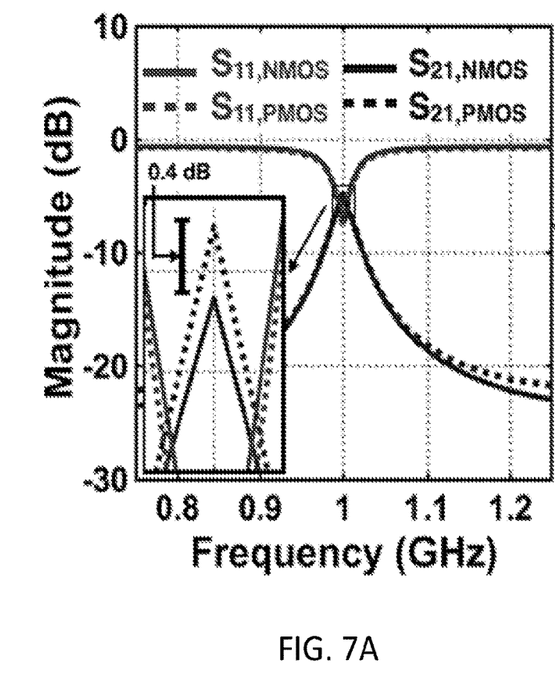
FIG. 7A shows a simulated comparison of S-parameters $S_{21}$ and $S_{11}$ for an N-Path filter of FIG. 5 based on NMOS and PMOS switches.
Figure 7B:
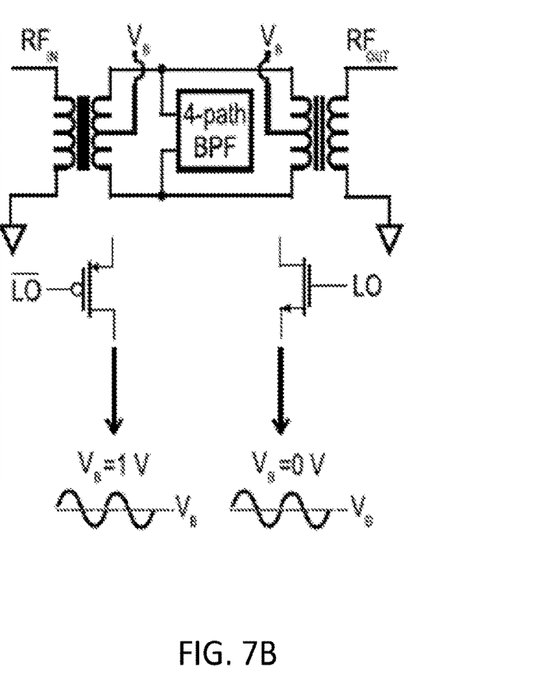
FIG. 7B illustrates the configuration of the NMOS and PMOS switches.

FIG. 7A compares the simulated S-parameters of a shunt NMOS and PMOS-based N-path filter each with the same device geometry illustrated in FIG. 7B. The out-of-band (OOB) rejection is degraded by less than 1 dB, while the insertion loss (IL) is slightly improved due to higher switch resistance and higher equivalent resistances (Rss). Another advantage of using PMOS switches is the relatively high common-mode voltage ($V_{dc}$≈1V) applied at the source and drain to keep the switch OFF when the LO is high. The high common-mode voltage allows an NMOS transconductance ($G_m$) stage to directly sample the IF capacitors on the N-path filter. The simulated input P1dB of PMOS N-path is 0.95 dB higher than that of NMOS N-path.

Figure 8:
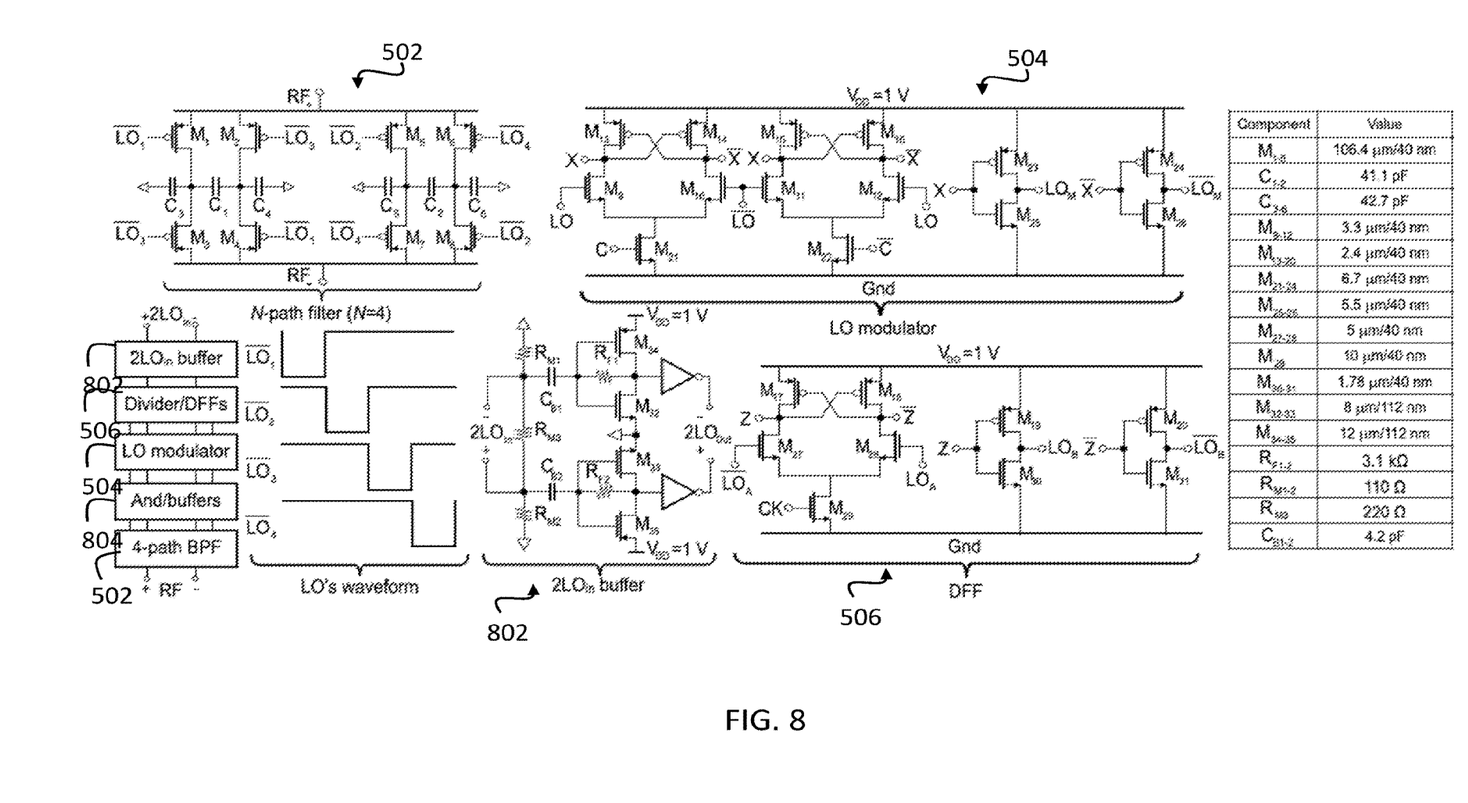
FIG. 8 shows a preferred transistor implementation of the preferred embodiment spectrum sensing carrier aggregation receiver.

FIG. 8 shows a preferred transistor implementation of the FIG. 5 spectrum sensing carrier aggregation receiver 100. The FIG. 8 PMOS N-path filter shown in FIG. 8 consists of four paths. The size of the switches is an example implementation was 106.4 µm/40 nm, while the baseband capacitors are based on a hybrid capacitor bank [C. K. Luo, P. S. Gudem, and J. F. Buckwalter, "A 0.4-6-GHz 17-dBm B1dB 36-dBm IIP3 channel-selecting low-noise amplifier for SAW-less 3G/4G FDD diversity receivers," IEEE Transactions on Microwave Theory and Techniques, vol. 64, no. 4, pp. 1110-1121 April 2016] with high-density capacitors and shunt capacitors to improve the OOB rejection and CM noise generated on chip from LO leakage, and the equivalent capacitance value is 124.9 pF.

The PN-modulated LO generator 504 allows the adjustment of LO phase overlap with the pseudo noise sequence. Digitally XORing the LO phase with the pseudo sequence value produces the spectral components of the LO that shifts the bandpass impedance of the N-path filter 502 to the desired frequency channel. The frequency divider 506 is preferably implemented with D flip-flops (DFFs) based on thin-oxide devices with 1-V supply for speed, and thus, the common voltage on the RF and BB nodes is 1 V. An input buffer 802 (part of the frequency divider 506 in FIG. 5) sharpens the clock transitions at twice the LO frequency before the clock divider and provides a wideband matching block. An output buffer 804 (such as a standard inverter amplifier) to LO generator 504 can be nonlinear by design because the buffer 804 should generate sharp transition edges. When modulated with a $W_{16}$ code, the LO signal is spread to different locations resembling the profile shown in FIG. 2.

Figure 9:
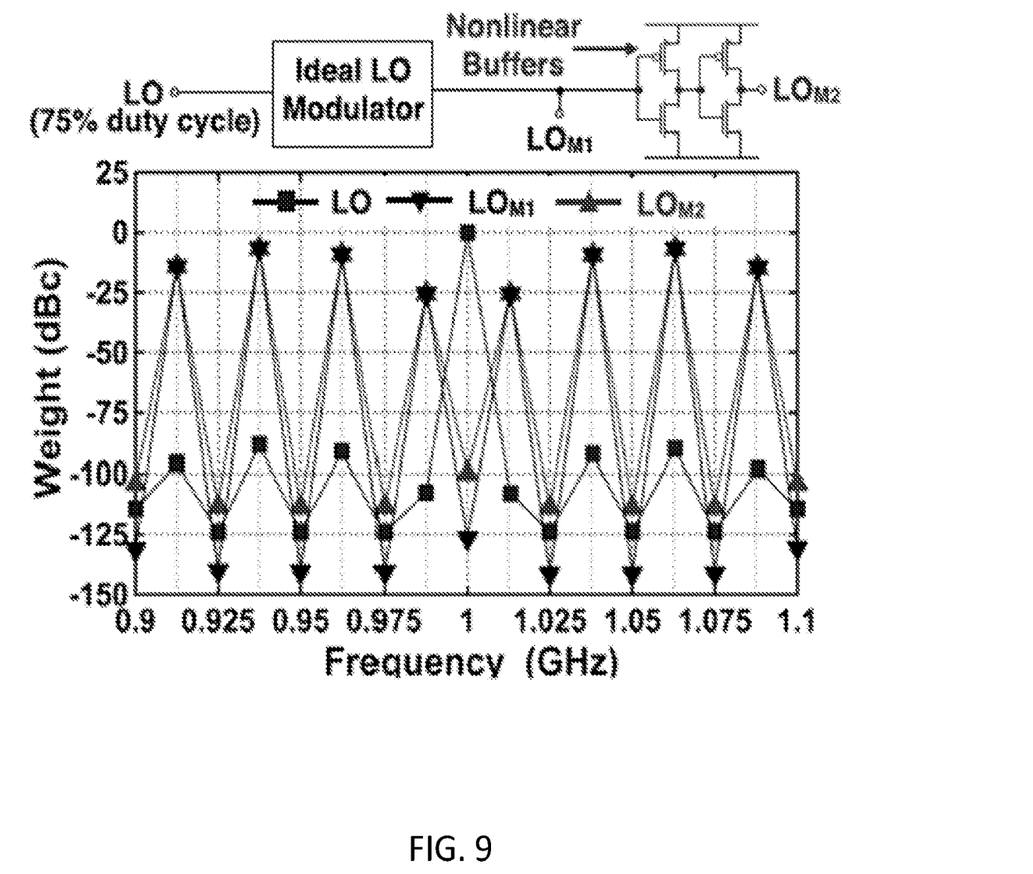
FIG. 9 shows the simulated impact of the nonlinear output buffer in FIG. 8 on a modulated LO signal with $W_{16}$.

FIG. 9 shows the simulated impact of the nonlinear output buffer 804 on a modulated LO signal with $W_{16}$. The impact of nonlinear buffers on the modulated LO signal is minimal as the harmonic components of the modulated LO signal passed through two inverters show no change in the amplitude of the LO components. The even harmonics show an undesirable increase of around 30 dB but remain around −100 dBc.

Figure 10:
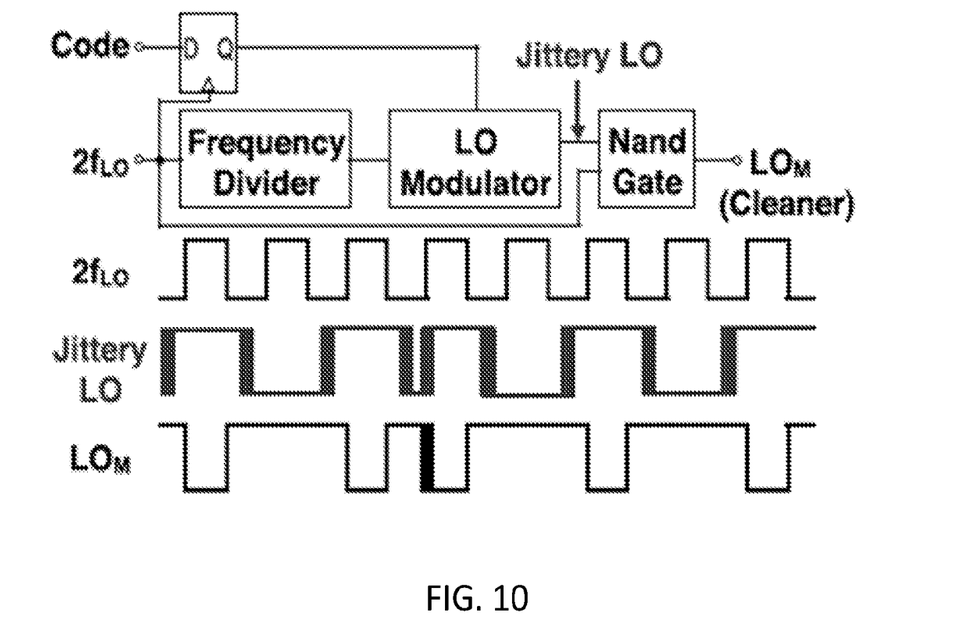
FIG. 10 illustrates that clock gating self-cleans the phase noise of frequency divider and LO modulation of FIG. 5 and FIG. 8.

While the frequency divider and LO modulator might be expected to degrade the LO phase noise, a gating technique prevents unnecessary jitter accumulation from the divider and modulator. FIG. 10 illustrates that clock gating self-cleans the phase noise of frequency divider and LO modulation. The code is sampled with the DFF clocked with the LO to ensure that the modulation begins at the beginning of the LO waveform. At the code transition, the only vulnerable edge occurs when the rising edge of the 2 $f_{LO}$ overlaps the jittered LO to transfer phase noise of the divider and modulator to the LO.

Figure 11:
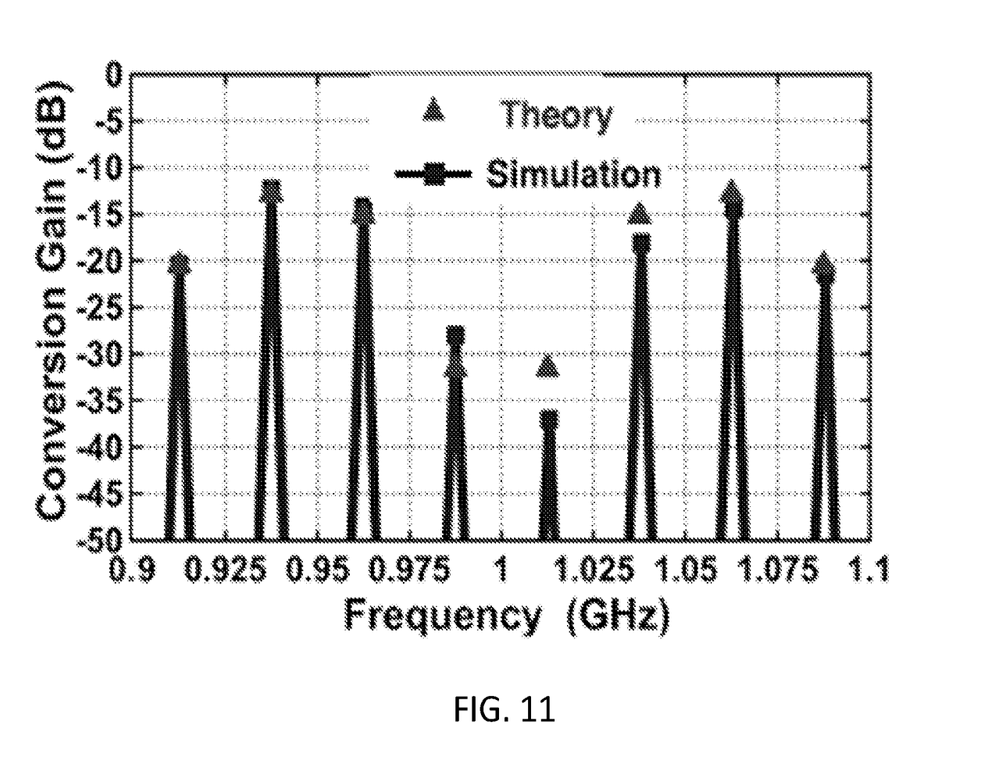
FIG. 11 shows the simulated LO spectrum before modulation showing a peak at $f_{LO}$ of 1 GHz.

FIG. 11 shows the simulated LO spectrum before modulation showing a peak at $f_{LO}$ of 1 GHz, which compares the theoretical conversion gain for the PN-modulated N-path filter when modulated with $W_{16}$. The simulation indicates close agreement with theory at six distinct peaks (−20-dB conversion gain) and some small discrepancy at the weaker harmonics. The conversion gain is normalized to the unmodulated LO.

Figure 12:
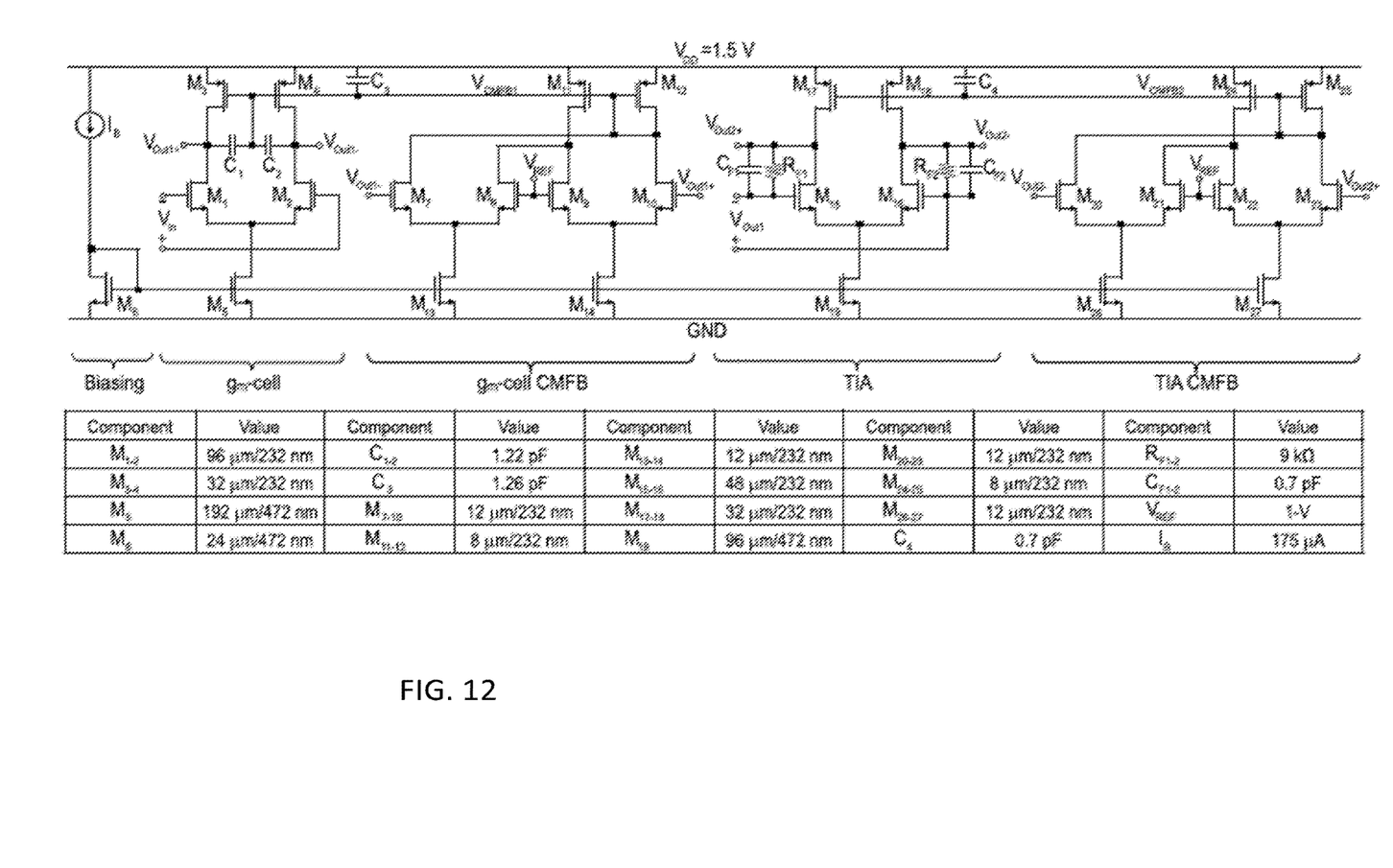
FIG. 12 provides a transistor-level schematic of an amplifier/buffer that samples the PMOS N-path filter output of FIG. 5.

FIG. 12 provides a transistor-level schematic of a preferred baseband amplifier for the I and Q amps 508 of FIG. 5. Unlike earlier work that realized the N-path as a mixer-first structure such that the BB impedance ($Z_{BB}$) is low at dc for impedance matching (current-mode N-path) requiring a transimpedance amplifier (TIA)-based BB amplifier, the FIG. 12 circuit presents a high impedance such that the RF signal power passes through the filter and matches to the output port, i.e., voltage mode with high $Z_{BB}$)N-path. One advantage of the voltage-mode N-path filter is providing both $RF_{out}$ and $BB_{out}$ ports for down-conversion and sampling. However, the disadvantage of both ports is an increased insertion loss by adding mismatch that might be tuned out with a matching network at the expense of lower frequency range. The FIG. 12 BB amplifier stage that samples the IF capacitors with a Gm-cell and a TIA (transimpedance amplifier). The baseband amplifier is implemented with thick-oxide devices operating at 1.5 V. Adding a $G_m$ cell between the baseband capacitors and the TIA serves to convert the sampled voltage across the caps to current for the high-linearity TIA. The dc level on the PMOS switches sets the common-mode voltage for the $G_m$-cell. The input common-mode voltage range is given by:

$$V_{th1,2}+V_{od1,2}+V_{sat5} \leq V_{IN,CM} \leq V_{DD,A}-|V_{sat3,4}|. \quad (8)$$

Typical values of $V_{th1,2}=0.35$ V, $V_{od1,2}=0.15$ V, $V_{DD,A}=1.5$V, and $V_{sat5}=|V_{sat3,4}|=0.2$ V suggest a range 0.7 V≤$V_{IN,CM}$≤1.3 V. Consequently, choosing $V_{IN,CM}=1$ V provides the maximum input voltage swing and improves linearity. Considering a $G_m$-cell with PMOS input devices, the common-mode voltage requirement is between 0.2 V≤$V_{IN,CM}$≤0.8 V. However, a common-mode approach to bias the NMOS switches at a voltage slightly higher than 0 V (around 0.5 V) to set the common-mode level of the PMOS input devices of $G_m$-cell has two issues: 1) decreasing the ON resistance of the switch lowers the out of band rejection and 2) PMOS devices have lower mobility and thus lower transconductance for the same current compared to NMOS devices, which results in lower gain and higher NF (noise figure). Consequently, PMOS-based switches with an NMOS-based baseband amplifier are preferred.

The main amplifier FIG. 12 (508 in FIG. 5) has high transconductance (gm) to lower the NF. The CMFB is sized to be ⅛ smaller than the main amplifier. To stabilize the CMFB, a load capacitor is added to the feedback node and two Miller capacitors are added across the second gain stage of the feedback. The TIA is similar to the $G_m$-cell with a feedback resistor and capacitor to set the BB BW. The gain of each of the BB amplifiers is approximately 36 dB in the example prototype that was fabricated. Testing of the prototype revealed significant reductions in power consumption and active area to realize a wideband RX capable of extremely high dynamic range. Switching times of less than 25 nanoseconds were demonstrated. Additional performance attributes of the prototype are given in the following table:

| Process | GF 45 nm RF SOI |
| --- | --- |
| Frequency (GHz) | 0.1-1.4 |
| CA Span (GHz) | 1 |
| Limited by PLL settling time? | No |
| Switch Time (ns) | <25 |
| CA Sensitivity (dBm)/ | −86/OPSK 1 Mbps |
| Modulation type | −77/QAM16 1 Mbps |
| Power Consumption (mW) | 23.1 |
| BB Gain (dB) | 36 |
| NF (dB) | 9.8-17.1 |
| IB IIP3 (dBm) | >−14.5 |
| Minimum Detectable Signal (dBm)/ Bitrate (Mbps) | −861 |
| OOB Rejection (dB) | 49 |
| Active Area (mm$^2$) | 0.55 |

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A method for carrier aggregation, the method comprising:
   receiving a signal with multiple non-contiguous carrier bands;
   frequency converting the signal to a compressed single intermediate frequency band with a pseudonoise code applied to a local oscillation of each of the multiple non-contiguous carrier bands while maintaining separation of the multiple non-contiguous carrier bands;
   analog to digital converting the compressed single intermediate frequency band to a combined digital signal; and
   conducting digital signal processing of the combined digital signal to detect spectral power density and waveform characteristics across multiple channels over non-contiguous carrier bands and obtain data from each of the multiple non-contiguous carrier bands from the combined digital signal.

2. The method of claim 1, wherein the frequency converting comprises modulating a local oscillator signal with the pseudonoise code followed by N-path filtering.

3. The method of claim 2, wherein the pseudnoise code is configured to produce a unique set of spectral tones that sample-specific channels over the multiple non-contiguous carrier bands.

4. The method of claim 1, wherein the conducting digital signal processing demodulates the data for each of the multiple non-contiguous carrier bands without re-tuning.

5. The method of claim 1, wherein the conducting digital signal processing demodulates the data for each of the multiple non-contiguous carrier bands without re-calibrating frequencies of the multiple non-contiguous carrier bands.

6. The method of claim 1, wherein the conducting digital signal processing completes an observation of the power spectral density and then changes modulated code to sample additional channels without a change in local oscillator frequency.

7. The method of claim 1, wherein the converting the signal comprises first dividing the frequency into in-phase and quadrature components separately (I+, Q+, I− and Q−) and applying the pseudonoise code to each of the in-phase and quadrature components I+, Q+, I− and Q.

8. The method of claim 1, further comprising amplifying the compressed intermediate signal prior to the analog to digital converting.

9. The method of claim 8, wherein the amplifying the compressed intermediate signal comprises nonlinear amplification to generate sharp edges in the compressed intermediate signal.

10. The method of claim 1, wherein the conducting digital signal processing demodulates the data for each of the multiple non-contiguous carrier bands without altering a local oscillation frequency used in said converting.

11. A method for carrier aggregation, the method comprising:
    receiving a signal with multiple non-contiguous carrier bands;
    frequency converting the signal to a compressed single intermediate frequency band with a pseudonoise code applied to a local oscillation of each of the multiple non-contiguous carrier bands while maintaining separation of the multiple non-contiguous carrier bands;
    analog to digtal converting the compressed single intermediate frequency band to a combined digital signal; and
    conducting digital signal processing of the combined digital signal to detect spectral power density and waveform characteristics across multiple channels over non-contiguous carrier bands and/or obtain data from each of the multiple non-contiguous carrier bands the combined digital signal, wherein the converting the signal maintains a minimal spacing between the multiple non-contiguous carrier bands in the compressed single intermediate frequency according to the bandwidth of the signals and spectral components of pseudonoise code.

12. A spectrum compressing receiver for carrier aggregation of multiple non-contiguous carrier bands, the receiver comprising:
    a local oscillator generator that receives a carrier aggregation signal and a fixed local oscillator signal and provides a modulated output signal;
    a pseudorandom noise generator applying a pseudo noise code to the local oscillator generator to produce a unique set of spectral tones in the output signal that sample-specific channels over the multiple non-contiguous carrier bands;
    an N-Path Filter to down convert output of the output signal to an aggregated intermediate frequency output signal with sufficient bandwidth for the carrier aggregation channels;
    an analog to digital converter to convert the aggregated intermediate frequency output signal to a digitized signal; and
    a digital signal processor to recover each of the multiple non-contiguous carrier bands from the digitized signal.

13. The receiver of claim 12, wherein the local oscillator generator comprises a non-linear output buffer to generate sharp edges in the modulated output signal.

14. The receiver of claim 12, comprising a frequency divider prior to the local oscillator generator to divide the carrier aggregation signal into in-phase and quadrature components separately (I+, Q+, I− and Q−).

15. The receiver of claim 14, wherein the frequency divider comprises D flip-flops (DFFs) from thin-oxide 1V transistor devices.

16. The receiver of claim 12, further comprising an amplifier between the N-Path filter and the analog to digital converter.

17. The receiver of claim 16, wherein the amplifier comprises separate I and Q amplifiers.

18. A spectrum compressing receiver for carrier aggregation of multiple non-contiguous carrier bands, the receiver comprising:
    a local oscillator generator that receives a carrier aggregation signal and a fixed local oscillator signal and provides a modulated output signal;
    a pseudorandom noise generator applying a pseudo noise code to the local oscillator generator produce a unique set of spectral tones in the output signal that sample-specific channels over the multiple non-contiguous carrier bands;
    an N-Path Filter to down convert output of the signal to an aggregated intermediate frequency output signal with sufficient bandwidth for the carrier aggregation channels;
    an analog to digital converter to convert the aggregated intermediate frequency output signal to a digitized signal; and
    a digital signal processor to recover each of the multiple non-contiguous carrier bands from the digitized signal, wherein the N-Path filter comprises a voltage mode filter that provides separate output ports for down conversion and sampling.

* * * * *